United States Patent
Demerath

(10) Patent No.: US 6,796,895 B2
(45) Date of Patent: Sep. 28, 2004

(54) AIR DIFFUSOR, ESPECIALLY FOR VEHICLE AIR-CONDITIONING

(75) Inventor: Michael Demerath, Hüffler (DE)

(73) Assignee: TRW Automotive Electronics & Components GmbH & Co. KG, Enkenbach-Alsenborn (DE)

( * ) Notice: Subject to any disclaimer, the term of this patent is extended or adjusted under 35 U.S.C. 154(b) by 0 days.

(21) Appl. No.: 09/966,194

(22) Filed: Sep. 28, 2001

(65) Prior Publication Data

US 2002/0045421 A1 Apr. 18, 2002

(30) Foreign Application Priority Data

Oct. 18, 2000 (DE) ..................................... 200 17 852 U

(51) Int. Cl.$^7$ ................................................ B60H 1/34
(52) U.S. Cl. ...................... 454/155; 454/202; 454/320
(58) Field of Search .................................. 454/155, 202, 454/318, 319, 320, 315

(56) References Cited

U.S. PATENT DOCUMENTS

| 4,676,146 A | | 6/1987 | Takahashi et al. | |
| 4,840,113 A | | 6/1989 | Freitag | |
| 5,063,833 A | * | 11/1991 | Hara et al. | 454/152 |
| 5,072,657 A | | 12/1991 | Sakai | |
| 5,470,276 A | | 11/1995 | Burnell et al. | 454/155 |
| 5,520,579 A | * | 5/1996 | Saida | 454/155 |
| 6,340,328 B1 | * | 1/2002 | Schwandt et al. | 454/155 |

FOREIGN PATENT DOCUMENTS

| DE | 3719835 A1 | 12/1988 |
| DE | 19728305 A1 | 1/1999 |

* cited by examiner

Primary Examiner—Harold Joyce
(74) Attorney, Agent, or Firm—Tarolli, Sundheim, Covell & Tummino L.L.P.

(57) ABSTRACT

The invention relates to an air diffusor, in particular for vehicle air-conditioning, the air diffusor comprising a housing, a plurality of vanes of which each is pivotally mounted, and an adjustment element by means of which an orientation of the vanes can be adjusted. A first coupling element is provided with which each vane is coupled so as to be rotatable about a first swiveling axle. The first coupling element is supported on the housing so as to slide in a sliding guide, and a second swiveling axle is provided on each vane.

9 Claims, 4 Drawing Sheets

AIR DIFFUSOR, ESPECIALLY FOR VEHICLE AIR-CONDITIONING

TECHNICAL FIELD

The invention relates to an air diffusor, in particular for vehicle air-conditioning.

BACKGROUND OF THE INVENTION

Typically, an air diffusor has vanes which can be arranged either horizontally or vertically, and with which the direction of the airflow coming out of the vent can be adjusted. Normally, the vanes can be rotated about axes that are permanently stationary with respect to the housing. In order not to hinder the rotation of the vanes, there has to be sufficient space between the outer vanes and the housing. Consequently, at certain angle positions of the vanes in the edge area, the airflow can only be directed inadequately. Moreover, at certain angle positions, the impression is given of an uneven distribution of the diffusor surface.

BRIEF SUMMARY OF THE INVENTION

Therefore, the object of the invention is to reduce as much as possible the distance between the external vanes and the housing, especially in the two extreme positions of the vanes, so that there is no undirected airflow in the edge area of the vent. Moreover, at each angle position, a uniform distribution of the vanes across the surface of the diffusor should be possible.

This is achieved in an air diffusor which comprises a housing, a plurality of vanes of which each is pivotally mounted, and an adjustment element by means of which an orientation of the vanes can be adjusted. A first coupling element is provided with which each vane is coupled so as to be rotatable about a first swiveling axle. The first coupling element is supported on the housing so as to slide in a sliding guide, and a second swiveling axle is provided on each vane. Due to the fact that the vanes are not swiveled about a single swiveling axle that is permanently stationary with respect to the housing but rather about two swiveling axes, it is possible to maintain a very small distance between the external vanes and the housing by shifting the rotational axes of the vanes, even if the vanes are in their extreme positions. It is aimed for that the topmost and lowermost vanes lie directly against the housing when they are in their respective extreme positions.

According to a preferred embodiment of the invention it is provided for that a second coupling element is used that is movable relative to the housing, each of the vanes being coupled to the second coupling element in such a way that it can rotate about the second swiveling axle, and that the adjustment element is connected to the first and second coupling elements in such a way that, by activating the adjustment element, a position of the coupling elements relative to each other and thus an orientation of the vanes can be adjusted. With this embodiment, the shifting of the vanes results from the superposition of two translation movements by the coupling elements. In addition to the advantages listed above, by means of the manner of adjustment of the coupling elements, the arrangement of the vanes in different, tilted positions can be brought about in such a way that the impression is given of an even distribution of the vanes.

According to another preferred embodiment of the invention, it is provided for that the second swiveling axle is supported in a sliding guide in the housing, the sliding guide of the second swiveling axle being aligned approximately perpendicular to the sliding guide of the first coupling element. With this embodiment, a simple structure yields essentially the same advantages as with the first embodiment.

Advantageous embodiments of the invention will be apparent from the subordinate claims.

DETAILED DESCRIPTION OF THE PREFERRED EMBODIMENTS

Figure 1:
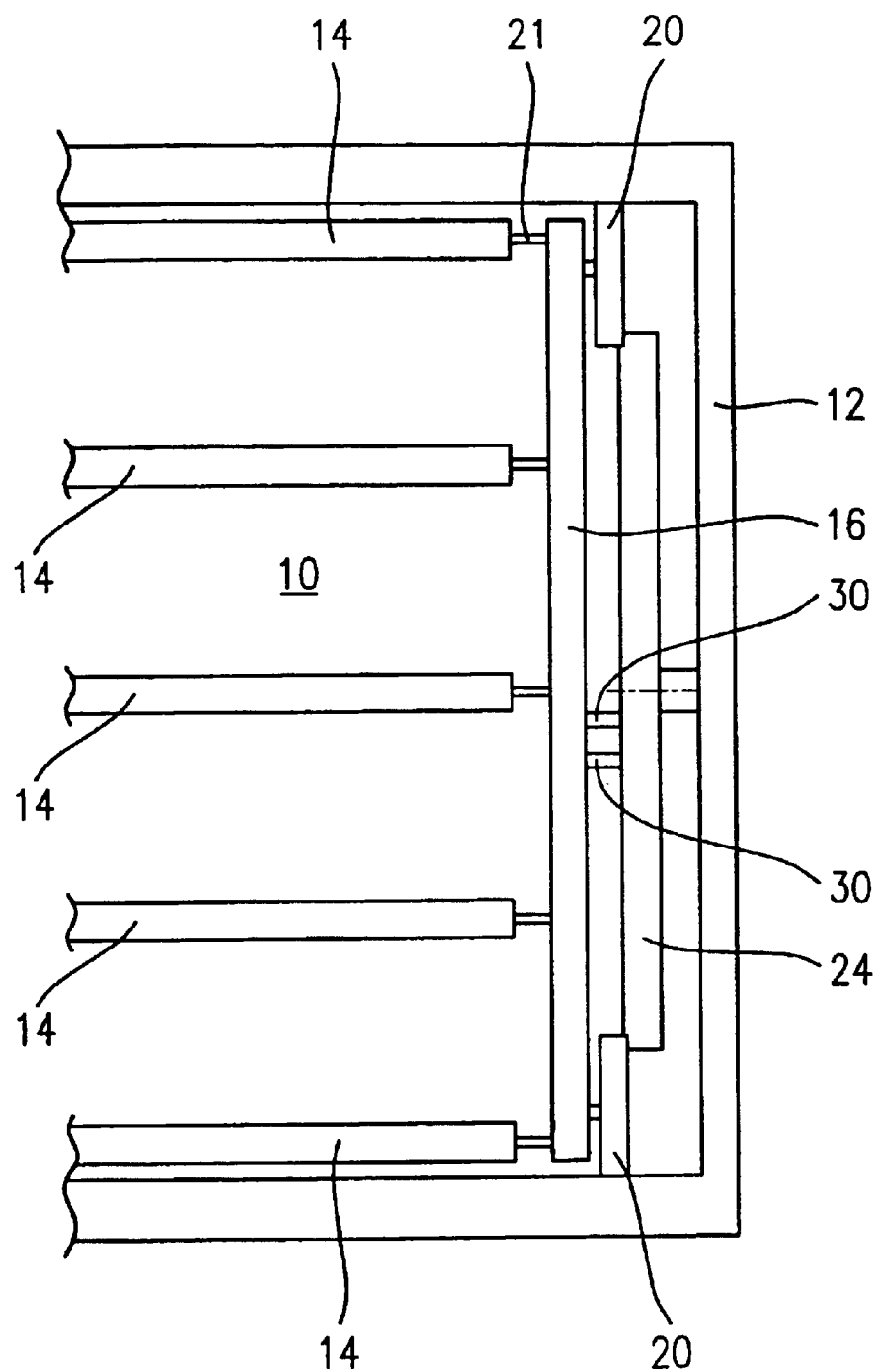
FIG. 1 is a front view of an air diffusor according to a first embodiment in a cut-away view.
Figure 2:
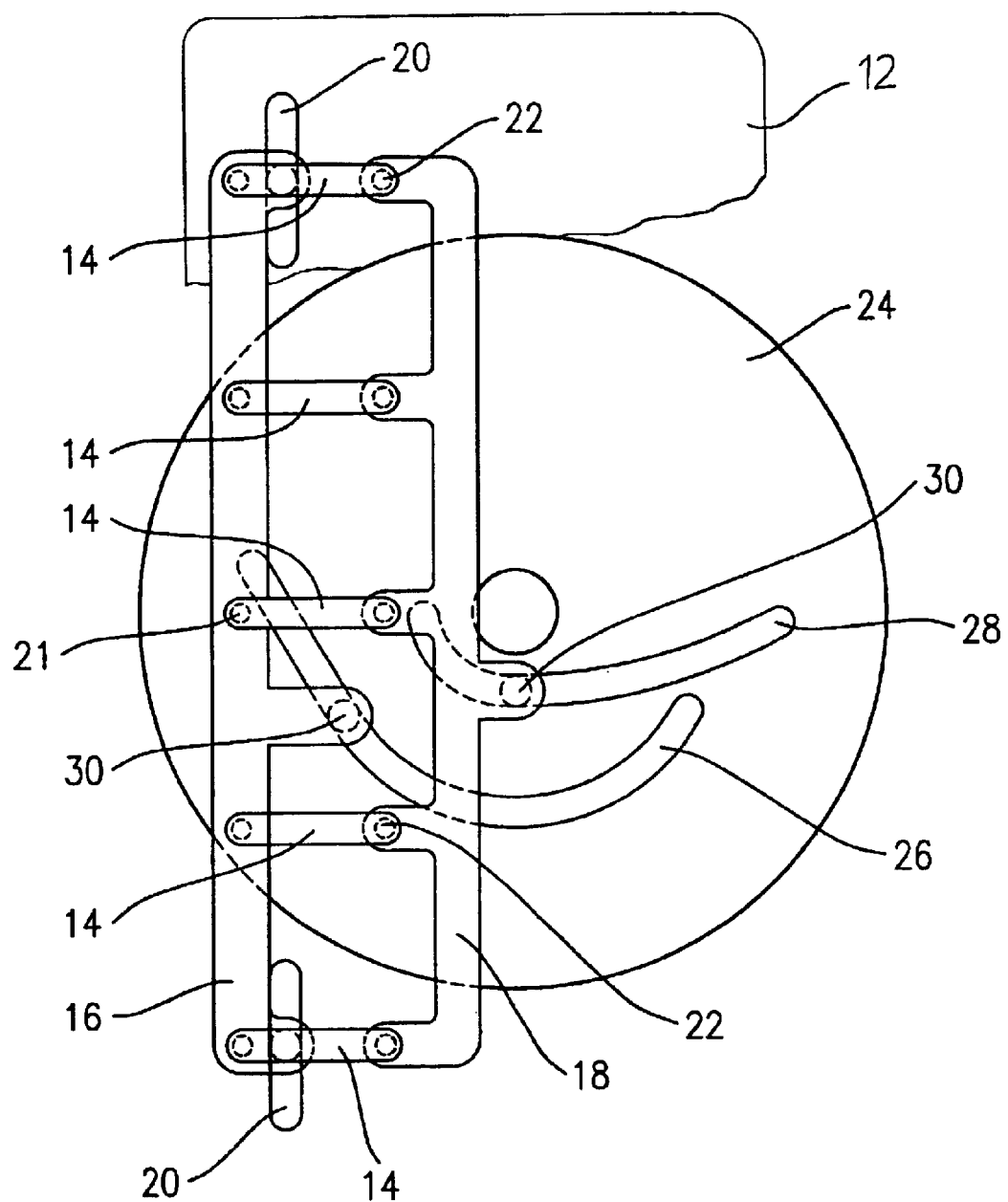
FIG. 2 is a side view of the air diffusor of FIG. 1.

FIG. 1 shows an air diffusor 10 according to a first embodiment that has a housing 12 as well as a plurality of vanes 14 arranged therein (also see FIG. 2).

In the housing, a first coupling element 16 is provided as well as a second coupling element 18, which are both designed as coupling rods. The first coupling element 16 is supported in the housing 12 in a sliding guide 20, which is only shown here schematically. A guide for the second coupling element 18 is not necessary. The front end of each of the vanes 14 is supported rotatably on the first coupling element 16 and the rear end of each of the vanes 14 is supported rotatably on the second coupling element 18. For this purpose, there are provided pegs 22 that engage in corresponding openings in the coupling elements.

An adjustment element 24 is rotatably supported in the housing 12 and it is configured as an adjustment wheel here. The adjustment element 24 is provided with a first slot 26 and a second slot 28. The two coupling elements 16, 18 are provided with pins 30 that engage in the slots 26 and 28 respectively, so that the position of the first coupling element 16 is determined by the first slot 26 while the position of the second coupling element 18 is determined by the second slot 28.

By rotating the adjustment element 26, the orientation of the vanes 14 can be adjusted relative to the housing, so that the direction of an airflow emerging from the diffusor 10 can be adjusted. When the adjustment element 24 is rotated clockwise away from the position shown in FIG. 2 in which the vanes 14 are positioned horizontally, the second coupling element 18 is shifted by the slot 28 downwards relative to FIG. 2, whereas the first coupling element 16 is not moved. This is due to the fact that the pin 30 of the first coupling element enters an area of the slot 26 that is approximately concentric to the rotational axis of the adjustment element 24. As a result of the shifting of the two coupling elements relative to each other, the rear area of the vanes 14 is moved downwards, whereas the front area remains approximately stationary. Consequently, an airflow coming out of the diffusor is deflected upwards.

Depending on the design of the slots, the front coupling element could also be shifted in response to a clockwise rotation so that the shifting of the vanes results from a superposition of two movements.

However, when the adjustment element 24 is rotated counterclockwise from the position shown in FIG. 2, the first coupling element 16 is shifted downwards. The second coupling element 18 moves only slightly since the pin 30 of the second coupling element enters an area of the slot 28 that extends approximately concentric to the rotational axis of the adjustment element 24, that is to say, to the left towards the first coupling element relative to FIG. 2, while it remains at about the same height. Thus, the front edge of the vanes 14 is moved downwards and an airflow coming out of the diffusor is deflected downwards.

Since the vanes 14 are no longer swiveled about a stationary axis as is the case with a conventional air diffusor, but rather are shifted by means of the superposition of two translation movements by the coupling elements, the two outer vanes can be positioned much closer to the housing 12 and, in the extreme positions, can lie directly against said housing, so that the airflow coming out of the diffusor is deflected in this area as well.

In this embodiment, the coupling elements can be shifted by means of the adjustment wheel in such a way that the vanes can be brought into a position that is pivoted by 90° relative to FIG. 2, that is to say, into a vertical position in which they all lie in one plane. In this case, a narrow gap remains between each of the edges of the individual vanes and the air can emerge from the diffusor without being directed in a specific direction.

Figure 3:
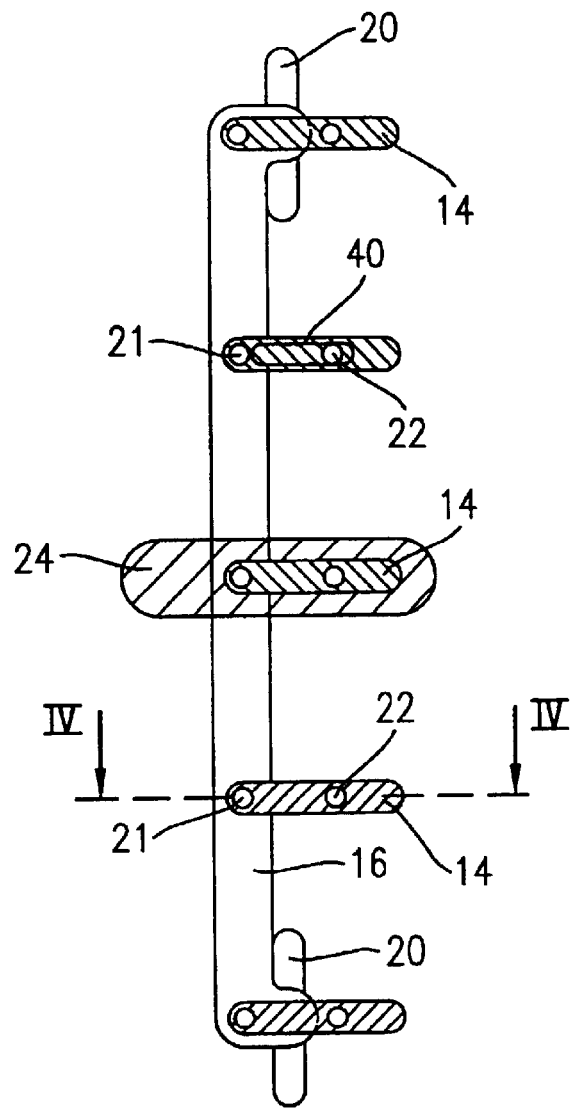
FIG. 3 is an air diffusor according to a second embodiment in a schematic side view.
Figure 4:
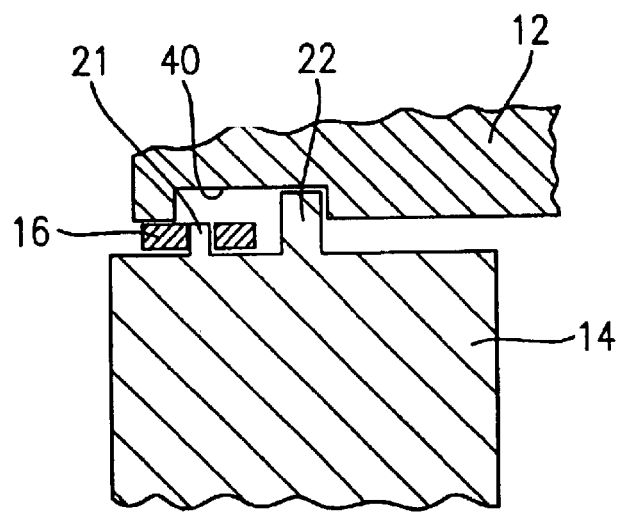
FIG. 4 is a section along the line IV—IV of FIG. 3.

FIGS. 3 and 4 show a diffusor 10 according to a second embodiment. The same reference numerals are used for the components known from the first embodiment, and reference is made to the explanations above.

In the second embodiment as well, a first coupling element 16 is provided for sliding movement on the housing and to which the vanes are attached by means of the first swiveling axle 21. In contrast to the first embodiment, however, there is no second coupling element provided; each vane is supported in the housing by means of the second swiveling axle 22 directly in a second sliding guide 40 (here shown for only one of the vanes). The second swiveling axle 22 is positioned somewhat behind the middle of the vane as seen from the first swiveling axle arranged on the front edge of each vane.

The vanes can be swiveled by means of the adjustment element 24 into the desired position, the adjustment element being designed here as an adjustment knob that is mounted directly on one of the vanes so that it is accessible from the outside.

With this embodiment, too, the vanes are shifted by means of the superposition of two translation movements; the first swiveling axle 21 is adjusted in the direction established by the first sliding guide 20, whereas the second swiveling axle 22 is shifted in the direction perpendicular thereto, established by the second sliding guide 40.

Figure 5:
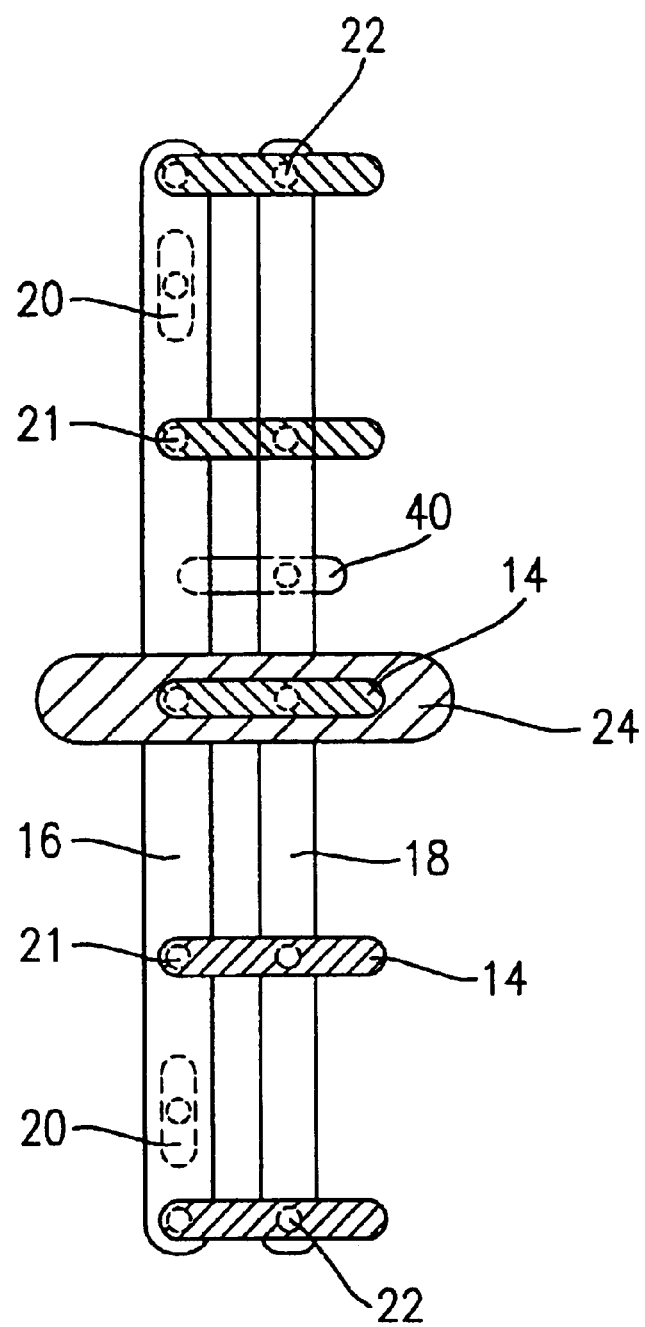
FIG. 5 is an air diffusor according to a third embodiment in a schematic side view.

FIG. 5 shows an air diffusor according to a third embodiment. Here, like in the first embodiment, a second coupling element 18 is provided on which the vanes 14 are rotatably supported with their second swiveling axle 22. In order to guide the coupling element, a second sliding guide 40 is provided that is positioned perpendicular to the sliding guide 20 for the first coupling element. Since the parallel arrangement of the two coupling elements is ensured by the connection to the vanes, it is sufficient to have one single sliding guide on the second coupling element.

As an alternative, it would also be possible to use an adjustment wheel with a guide for the first coupling element in order to guide the first coupling element, as is fundamentally known from the first embodiment. Then it is possible to dispense with the adjustment knob for purposes of adjusting the vanes.

What is claimed is:

1. An air diffusor comprising:

a housing, a plurality of vanes of which each is pivotally mounted, and an adjustment element by means of which an orientation of said vanes can be adjusted, a first coupling element being provided with which each vane is coupled so as to be rotatable about a first swiveling axle, said first coupling element being supported on said housing so as to slide in a sliding guide, and a second swiveling axle being provided on each vane, a second coupling element being provided that is movable relative to said housing, each of said vanes being coupled to said second coupling element in such a way that each of said vanes can rotate about an associated second swiveling axle;

said adjustment element being connected to said first and second coupling elements in such a way that, by activating said adjustment element, a position of said coupling elements relative to each other and thus said orientation of said vanes can be adjusted;

said adjustment element being an adjustment wheel that is rotatably supported in said housing and that interacts with said coupling elements by means of two slot-and-pin guides.

2. The diffusor according to claim 2, wherein said slot-and-pin guides of said adjustment wheel are constituted by two slots formed in said adjustment wheel and one pin provided on said each of said coupling elements, said pins being in engagement in said slots, respectively.

3. An air diffusor comprising:

a housing, a plurality of vanes of which each is pivotally mounted, a single movable adjustment element which moves to adjust an orientation of said vanes by pivoting said vanes, a sliding guide, and a first coupling element with which each vane is coupled so as to be rotatable relative to said first coupling element about a first swiveling axis, said first coupling element being supported on said housing so as to slide in said sliding guide, and a second coupling element that is movable relative to said housing, each of said vanes being coupled to said second coupling element so as to be rotatable about a second swiveling axis which is spaced apart from said first swiveling axis and about which each vane pivots while pivoting about said first swiveling axis, said single movable adjustment element engaging said first and second coupling elements simultaneously to move said first and second coupling elements.

4. The diffusor according to claim 3, wherein in said housing a second sliding guide is provided in which said second coupling element is supported.

5. The diffusor according to claim 4, wherein said second sliding guide is aligned approximately perpendicular to said first sliding guide.

6. The diffusor according to claim 4, wherein said vanes have front and rear areas at which they are connected with said coupling elements.

7. The diffusor according to claim 4, wherein said second swiveling axis is supported in a sliding guide in said housing.

8. The diffusor according to claim 7, wherein said sliding guide of said second swiveling axis is aligned approximately perpendicular to said sliding guide of said first coupling element.

9. The diffusor according to claim 8, wherein said adjustment element is an adjustment knob mounted on one of said vanes.

* * * * *

UNITED STATES PATENT AND TRADEMARK OFFICE
CERTIFICATE OF CORRECTION

PATENT NO. : 6,796,895 B2
DATED : September 28, 2004
INVENTOR(S) : Michael Demerath It is certified that error appears in the above-identified patent and that said Letters Patent is hereby corrected as shown below:

Column 4,
Line 50, after "claim" change "2" to -- 1 --.

Signed and Sealed this

Twenty-ninth Day of March, 2005

JON W. DUDAS
*Director of the United States Patent and Trademark Office*